United States Patent
Jaleel et al.

(10) Patent No.: US 11,580,250 B2
(45) Date of Patent: *Feb. 14, 2023

(54) EFFICIENT TRAVERSAL OF HIERARCHICAL DATASETS

(71) Applicant: MetricStream, Inc., San Jose, CA (US)

(72) Inventors: Abdul Jaleel, Karnataka (IN);
Debdulal Samanta, Karnataka (IN);
Subramanya Krishnamurthy, Bangalore (IN); Abdul Rawoof Lohar, Bangalore (IN); Nishikanth Narayan, Bangalore (IN); Anil Bhat, Bangalore (IN); Manoj Ramanujan, Bangalore (IN); Vidyadhar Phalke, Saratoga, CA (US); Anindo Banerjea, Fremont, CA (US)

(73) Assignee: METRICSTREAM, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/318,351

(22) Filed: May 12, 2021

(65) Prior Publication Data
US 2021/0312072 A1    Oct. 7, 2021

Related U.S. Application Data

(63) Continuation of application No. 16/680,121, filed on Nov. 11, 2019, now Pat. No. 11,042,666.

(51) Int. Cl.
*G06F 21/62*    (2013.01)
*G06F 16/22*    (2019.01)
*G06F 16/2455*  (2019.01)

(52) U.S. Cl.
CPC ...... *G06F 21/6227* (2013.01); *G06F 16/2237* (2019.01); *G06F 16/2246* (2019.01);
(Continued)

(58) Field of Classification Search
CPC ............ G06F 16/2264; G06F 16/2237; G06F 16/2246; G06F 16/24552
(Continued)

(56) References Cited

U.S. PATENT DOCUMENTS 7,305,389 B2 * 12/2007 Zeng ..................... G06F 16/328
707/999.005
2008/0147745 A1 * 6/2008 Wilkinson ............. H04L 67/02
(Continued)

*Primary Examiner* — Giovanna B Colan
(74) *Attorney, Agent, or Firm* — Hickman Becker Bingham Ledesma LLP

(57) ABSTRACT

In one embodiment, a method comprises receiving a request for a particular user identification (ID) to perform a particular operation on a particular data object. An entitlement cache associates each operation that the particular user ID is entitled to perform with a first encoding of a tuple of a plurality of tuples. An object mapping cache associates each tuple of the plurality of tuples with a second encoding of each tuple of the plurality of tuples. An object mapping is used to determine a first tuple. The object mapping cache is used to determine a first vector of one of more left values based on the first tuple. The entitlement cache is used to determine a second vector of one or more value pairs. In response to identifying a match between the first vector and the second vector, the particular user ID is granted access to the particular data object.

20 Claims, 7 Drawing Sheets

(52) U.S. Cl.
CPC .... *G06F 16/2264* (2019.01); *G06F 16/24552* (2019.01); *G06F 16/24553* (2019.01)

(58) Field of Classification Search
USPC ......................................................... 707/741
See application file for complete search history.

(56) References Cited

U.S. PATENT DOCUMENTS

| | | | | |
|---|---|---|---|---|
| 2010/0169343 | A1* | 7/2010 | Kenedy | G06F 16/951 |
| | | | | 707/758 |
| 2016/0371618 | A1* | 12/2016 | Leidner | G06Q 10/0635 |
| 2017/0228425 | A1* | 8/2017 | Kandula | G06N 7/005 |

* cited by examiner

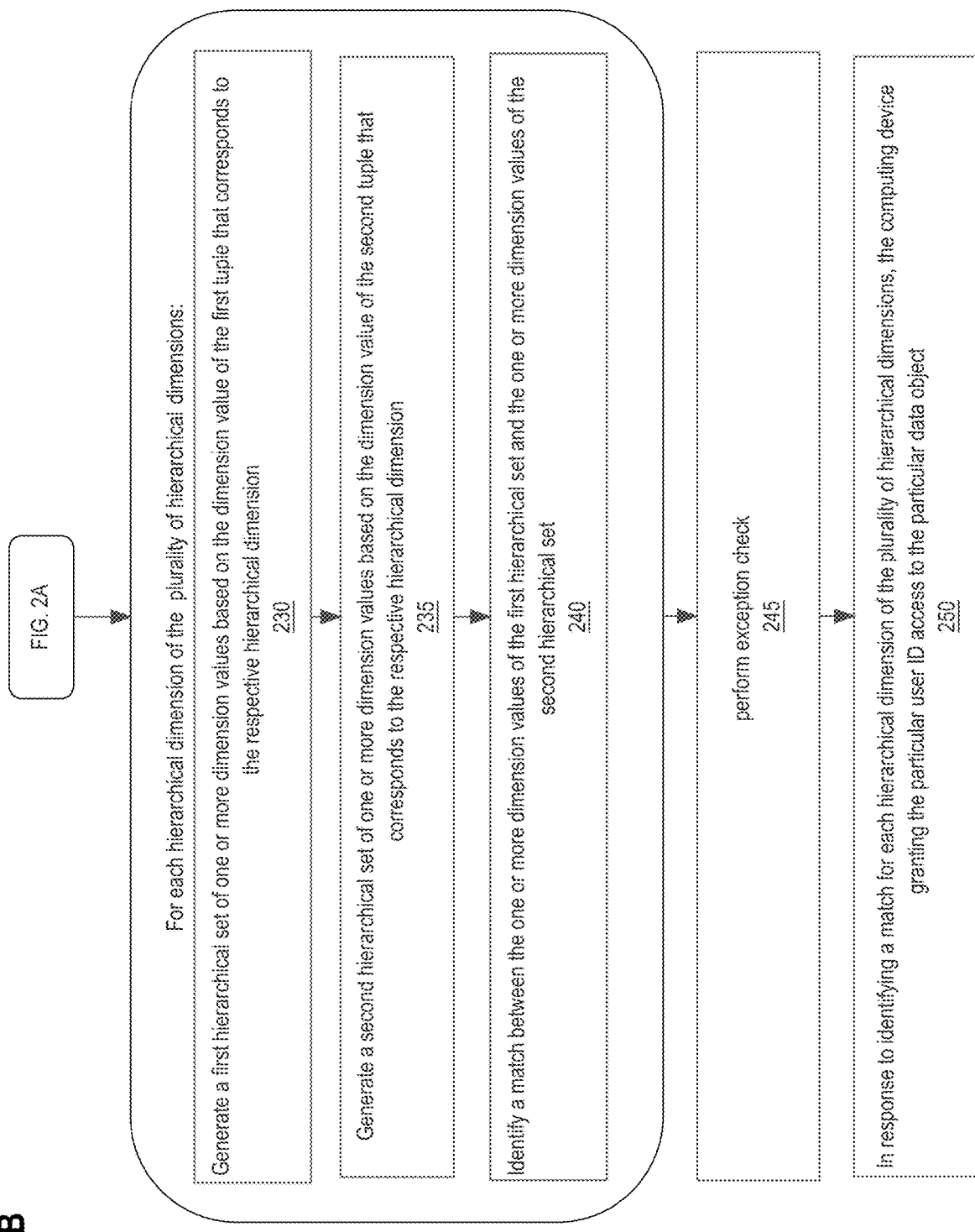

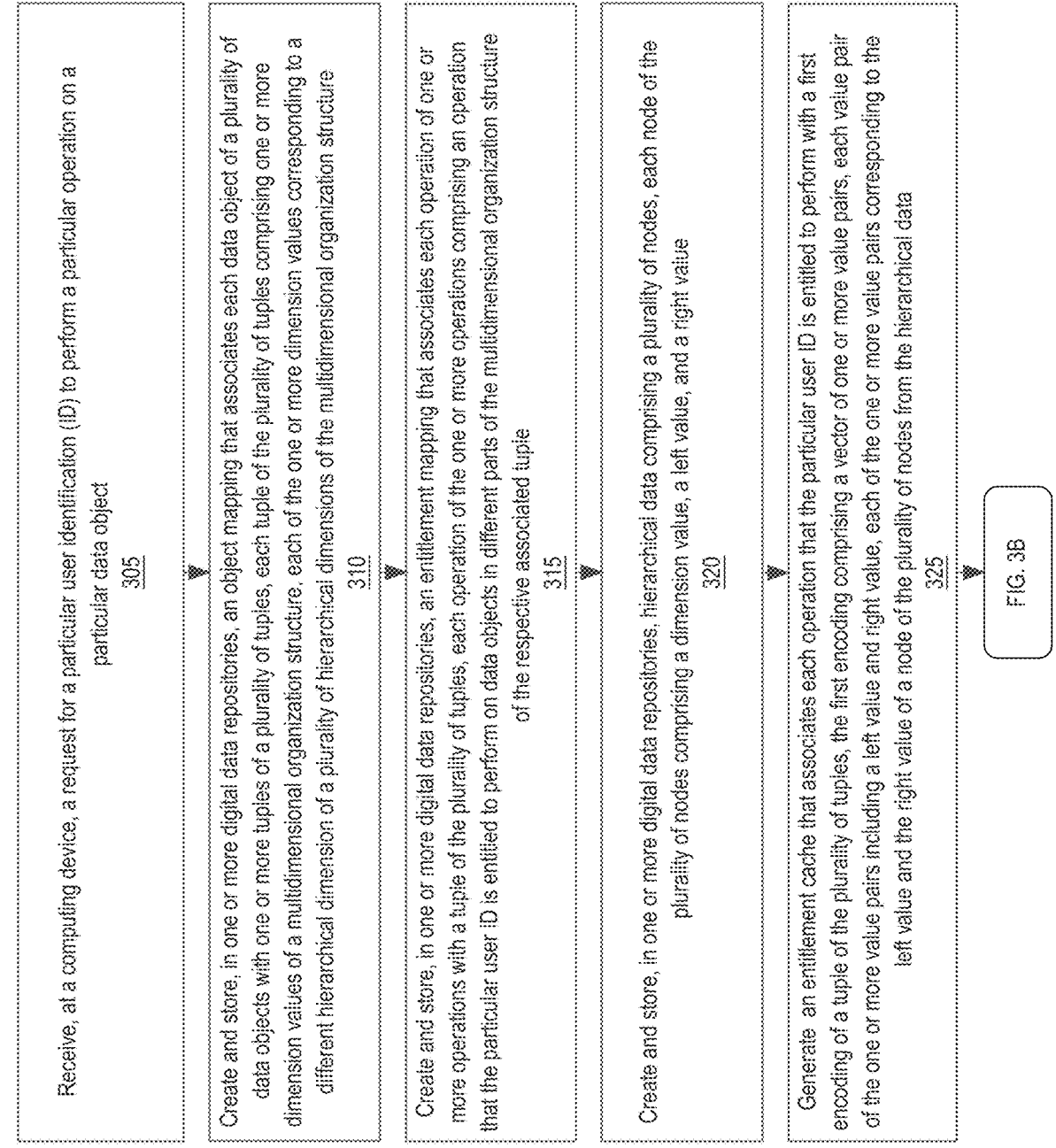

EFFICIENT TRAVERSAL OF HIERARCHICAL DATASETS

BENEFIT CLAIM

This application claims the benefit as a Continuation of application Ser. No. 16/680,121, filed Nov. 11, 2019, the entire contents of which is hereby incorporated by reference as if fully set forth herein, under 35 U.S.C. § 120, which claims the benefit to foreign application of India, Appln. Ser. No. 201931033543, filed Aug. 20, 2019, the entire contents of which is hereby incorporated by reference as if fully set forth herein, under 35 U.S.C. § 119.

TECHNICAL FIELD

One technical field of the present disclosure is computer-implemented techniques for control of access to data objects. Another technical field is computer-implemented management of information sharing and workflows in a multidimensional organization structure.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many large legal entities or enterprises are organized as business units or lines of business, for example: 'Wealth Management', 'Investment Banking', 'Personal & Corporate Banking', 'Asset Management', 'Corporate Center' and so on. Over time as organizations grow, there is a need to organize processes and systems based on different dimensions that are independent yet related to the lines of business.

Modern business organizations may structure themselves along a multidimensional organization structure which may include a set of dimensions and dimension values for each dimension. The set of dimensions may include dimensions such as 'Lines of Business', 'Functions', 'Locations', and 'Legal Entities'. The 'Lines of Business' dimension describes the type of business and may include dimension values such as: 'Wealth Management', 'Investment Banking', 'Personal & Corporate Banking', 'Asset Management', 'Corporate Center'. The 'Functions' dimension describes the functions of a business organization and may include dimension values such as 'Human Resources', 'Finance', 'Legal', 'Risk', 'Compliance', 'Operations & Technology', 'Corporate Affairs', 'Marketing & Advertising'. Each of these functions may have divisions and sub-divisions and may be organized hierarchically. The 'Locations' dimension describes geographies where a business organization has a presence or operates in and may include dimension values such as 'Worldwide', 'Continents', 'Countries', 'States', 'Cities' and so on. Each of these locations may have a sub-location and may be organized hierarchically. The 'Legal Entities' division describes legal entities associated with a business organization and may include different legally registered entities in specific geographic locations.

The number of dimensions in use in a given business may vary. Simple businesses may be best modeled as a single dimension, while a very complex global business might have four or more dimensions. For example, a bank holding company may include multiple lines of business with different functions in different locations. The bank holding company might include a 'Wealth Management' division that has 'Operations & Technology' functions in 'Portugal' and also an 'Asset Management' division that has 'Legal' functions in 'India'.

Technology in the field of governance, risk, and compliance (GRC) has emerged to assist enterprises in conforming to requirements of law, regulation or policy; when applied to computer systems, GRC often involves implementing software techniques for access control to digitally stored data objects or records in databases. That is, rational enterprise governance, risk management and regulatory or legal compliance cannot be achieved unless computer-implemented techniques are available to control which computers or accounts can create, read, update or delete specific digital data objects or records. Modern GRC standards indicate that systems and applications implemented in this kind of a business environment should provide the independence & security that each of these organizational dimension warrants, while at the same time ensuring adequate sharing of information & collaboration across dimensions. Current techniques suffer from lack of efficiency in performing access control operations in GRC systems that model multidimensional organization structures.

Techniques are desired for addressing information sharing and workflows in a multidimensional organization structure in real time and in a secure manner and at the same time eliminating the potential pitfalls of a siloed organizational structure.

Computer-implemented techniques disclosed herein address these and other issues.

SUMMARY

The appended claims may serve as a summary of the invention.

BRIEF DESCRIPTION OF THE DRAWINGS

In the drawings:

FIG. 2B illustrates an example programmable algorithm or method for traversing hierarchical data using a flow down query, according to an embodiment.

FIG. 3A illustrates an example programmable algorithm or method traversing hierarchical data using a nested set, according to an embodiment.

DETAILED DESCRIPTION

Figure 1:
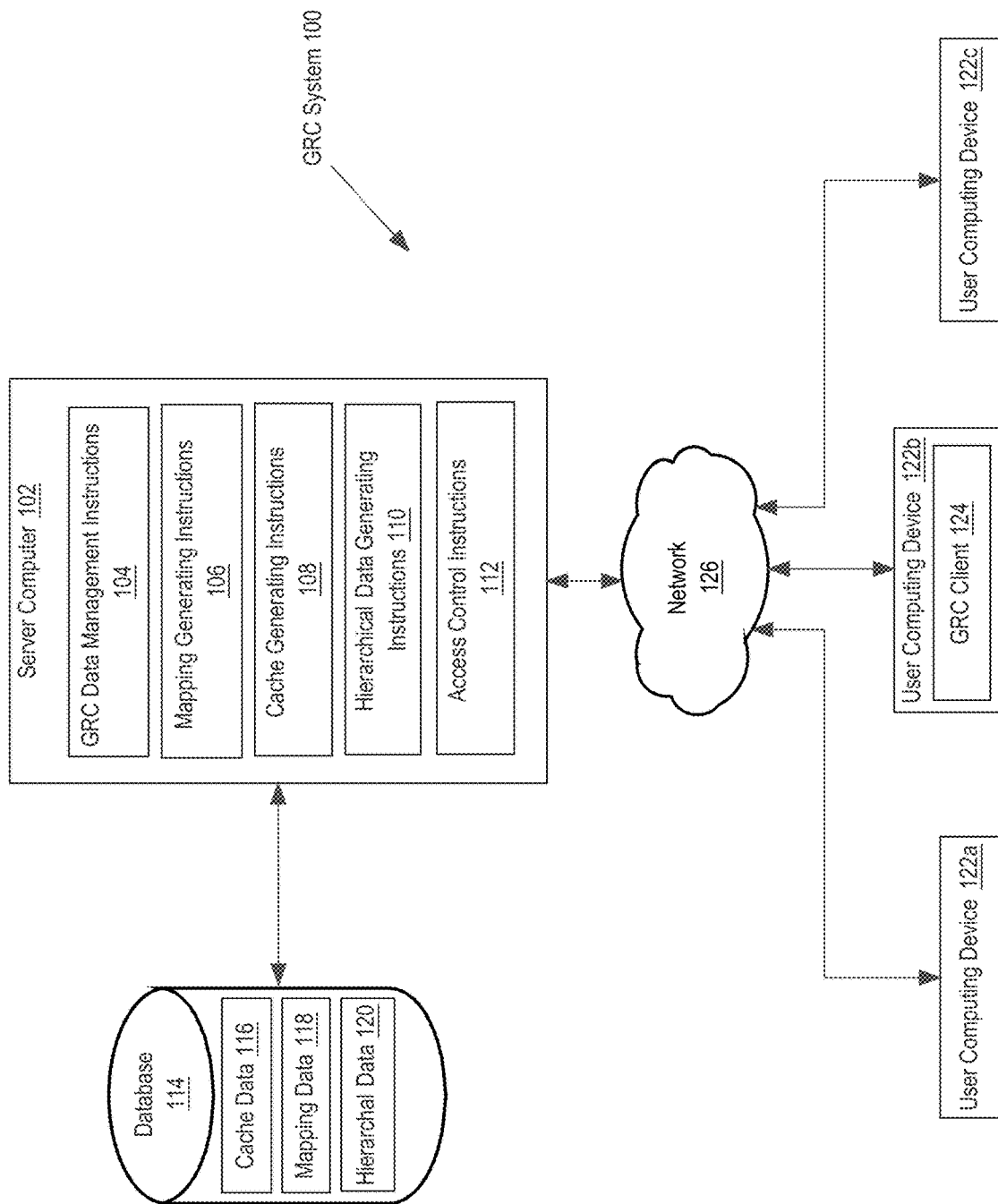
FIG. 1 depicts an example networked computing environment, according to an embodiment.

In the following detailed description, for the purposes of explanation, numerous specific details are set forth in order to provide a thorough understanding of various embodiments of improved linking of buyer accounts with suppliers in an electronic spend management system based on community overage data. It will be apparent, however, that the embodiments may be practiced without these specific details. In other instances, well-known structures and devices are shown in block diagram form in order to avoid unnecessarily obscuring the embodiments.

Embodiments are described in sections according to the following outline:
1.0 GENERAL OVERVIEW
2.0 EXAMPLE GRC SYSTEM
3.0 EXAMPLE TRAVERSAL OF HIERARCHICAL DATA
4.0 EXAMPLE NESTED SET TRAVERSAL OF HIERARCHICAL DATA
5.0 IMPLEMENTATION EXAMPLE—HARDWARE OVERVIEW
6.0 EXTENSIONS AND ALTERNATIVES 1.0 GENERAL OVERVIEW Techniques described herein provide a foundation for addressing information sharing and workflows in a real time and secure manner within a multidimensional organization structure.

Dynamic tuples are used to seamlessly drive data authorization and access privileges within a system. A dynamic tuple, herein referred to as a 'tuple', is a combination of dimension values that form a single unit of authorization that governs access to resources such as data objects. In general, a tuple comprises one or more dimension values. Each dimension value corresponds to a different dimension of a multidimensional organizational structure. For example, the tuple 'Umbrella Corporation.Banking.Europe' is a represented by three different dimensions. The dimension value 'Umbrella Corporation' corresponds to a 'Legal Entity' dimension, the dimension value 'Banking' corresponds to a 'Business Unit' dimension, and the dimension value 'Europe' corresponds to a 'Location' dimension. Each dimension value of a tuple may be included in a hierarchy of dimension values from the multidimensional organizational structure. For example, the dimension value 'Europe' may include child dimension values 'Germany' and 'Portugal' as part of the dimension value hierarchy for the 'Europe' dimension value.

A tuple can be mapped to a resource as well as a user account. In order to access a resource, a user account is required to possess a requisite tuple mapping in order to be able to access the resource. As an example, when a user attempts to access a data object in a system (e.g. a 'Regulatory Engagement Form'), an access control check is performed by comparing the resource tuple mapping to the user tuple mapping. The user is required possess a minimum required tuple mapping to access the form.

Due to the hierarchical nature of dimension values of tuples, traversing such dimension value hierarchies is required to adequately perform access control checks. For example, if a data object is mapped to the tuple 'Umbrella Corporation.Banking.Europe' and a user account is mapped to the tuple 'Umbrella Corporation.Banking.World', the tuples do not form an exact match because the 'Europe' dimension value is not equivalent to the 'World' dimension value. However, because the 'World' dimension value includes the 'Europe' dimension value as a child dimension value as part of the 'World' dimension value hierarchy, a match between tuples is identified and the user may be granted access the data object. Techniques for performing access control checks by traversing dimension value hierarchies of tuples are performed using a variety of methods, as described in detail herein.

In one embodiment, a computer implemented method comprises receiving, at a computing device, a request for a particular user identification (ID) to perform a particular operation on a particular data object; creating and storing, in one or more digital data repositories, an object mapping that associates each data object of a plurality of data objects with one or more tuples of a plurality of tuples, each tuple of the plurality of tuples comprising one or more dimension values of a multidimensional organization structure, each of the one or more dimension values corresponding to a different hierarchical dimension of a plurality of hierarchical dimensions of the multidimensional organization structure; creating and storing, in one or more digital data repositories, an entitlement mapping that associates each operation of one or more operations with a tuple of the plurality of tuples, each operation of the one or more operations comprising an operation that the particular user ID is entitled to perform on data objects in different parts of the multidimensional organization structure of the respective associated tuple; using the object mapping, determining a first tuple based on the particular data object; using the entitlement mapping, determining a second tuple based on the particular operation; for each hierarchical dimension of the plurality of hierarchical dimensions: generating a first hierarchical set of one or more dimension values based on the dimension value of the first tuple that corresponds to the respective hierarchical dimension, generating a second hierarchical set of one or more dimension values based on the dimension value of the second tuple that corresponds to the respective hierarchical dimension, identifying a match between the one or more dimension values of the first hierarchical set and the one or more dimension values of the second hierarchical set; in response to identifying a match for each hierarchical dimension of the plurality of hierarchical dimensions, the computing device granting the particular user ID access to the particular data object.

In one embodiment, a computer implemented method comprises receiving a request from a particular user identification (ID) to perform a particular operation on a particular data object; creating and storing, in one or more digital data repositories, an object mapping that associates each data object of a plurality of data objects with one or more tuples of a plurality of tuples, the plurality of data objects including the particular data object, each tuple of the plurality of tuples comprising one or more dimension values and indicating a multidimensional organization structure, each of the one or more dimension values corresponding to a different hierarchical dimension of a plurality of hierarchical dimensions; creating and storing, in one or more digital data repositories, an entitlement mapping that associates each operation of one or more operations with a tuple of the plurality of tuples, each operation of the one or more operations comprising an operation that the particular user ID is entitled to perform on data objects in different parts of the multidimensional organization structure of the respective associated tuple; creating and storing, in one or more digital data repositories, hierarchical data comprising a plurality of nodes, each node of the plurality of nodes comprising a dimension value, a left value, and a right value; generating an entitlement cache that associates each operation that the particular user ID is entitled to perform with a first encoding of a tuple of the plurality of tuples, the first encoding comprising a vector of one or more value pairs, each value pair of the one or more value pairs including a left value and right value, each of the one or more value pairs corresponding to the left value and the right value of a node of the plurality of nodes from the hierarchical data; generating an object mapping cache that associates each tuple of the plurality of tuples with a second encoding of each respective tuple of the plurality of tuples, the second encoding comprising a vector of one or more left values, each of the one or more left values corresponding to a left value of a node of the plurality of nodes from the hierarchical data; using the object mapping, determining a first tuple based on the particular data object; using the object mapping cache, determining a first vector of one of more left values based on the first tuple; using the entitlement cache, determining a second vector of one or more value pairs based on the particular operation; identifying a match between the first vector and the second vector; in response to identifying the match between the first vector and the second vector, the computing device granting the particular user ID access to the particular data object.

Other aspects, features and embodiments will become apparent from the disclosure as a whole. The described embodiments provide significant improvements to providing effective access control security across a multi-dimensional organization. Techniques described herein provide flexibility for organizations to define their own organization structure in context of dimensions and dimension values. Once an organization's structure is defined, techniques herein provide enhanced and efficient data security for information sharing across an organization. The simplistic tuple based approach to managing and controlling access to data objects provides a robust framework that adheres to GRC standards. These techniques offer, in addition to the improvements discussed above, reduced usage of network bandwidth, CPU cycles, storage, and/or memory because of the efficiency and efficacy of the algorithms that are disclosed.

Techniques described herein provide improvements to the technology or technical field of GRC computer systems, specifically, by providing effective software techniques for access control of data objects that meet GRC standards. Software techniques described herein for access control of data objects improve the technical field of GRC computer systems by enhancing security, efficiency, flexibility of GRC computer systems, all while complying with strict GRC standards imposed on multi-dimensional organizations who share sensitive data.

The security of GRC computer systems is enhanced by providing a robust but simplistic framework for governing access to sensitive data objects that represent confidential information with respect to a subset of user accounts of a GRC system. Sensitive data can be created, stored, and accessed by user accounts assigned to different organizational subunits of a multi-dimensional organization while maintaining data integrity using the tuple based techniques discussed herein.

The efficiency of GRC computer systems is enhanced by providing efficient algorithms and techniques to create hierarchical data models of multi-dimensional organizations and using such data models as a basis for efficiently governing access to data objects. Traversing such hierarchical data can be efficiently performed using a minimum of fast string or integer comparisons of tuples to control user account access to data objects. Traversal techniques discussed herein result in a conservation of CPU cycles, storage, and memory to execute such comparisons compared to previous hierarchical data traversal techniques.

The flexibility of GRC computer systems is increased by allowing administrators to flexibly define custom organization structures with multiple dimensions and providing the capability to update and modify such structures as their organizations grow and change. Using techniques discussed herein, custom defined organization structures are seamlessly integrated with efficient hierarchical data traversal techniques to provide effective data access control to data shared throughout a multi-dimensional organization

2.0 EXAMPLE GRC SYSTEM

FIG. 1 illustrates an example networked computing environment with which various embodiments may be practiced. FIG. 1 is shown in simplified, schematic format for purposes of illustrating a clear example and other embodiments may include more, fewer, or different elements.

In some embodiments, the GRC system 100 comprises a GRC server computer 102 ("server"), one or more user computing devices 122a-c, and a database 114, which may be communicatively coupled directly or indirectly via one or more networks 126.

In some embodiments, each of the user computing devices 122a-c broadly represents one or more computers, virtual computing instances, and/or instances of a GRC application program that are associated with a user account. A user computing device 122b is programmed to create a user account with the server 102 and to communicate with the server regarding different tasks and operations including: creating data objects such as issues through the server computer, assigning privileges to data objects, sending requests for access to read data objects, manipulating data objects, and deleting data objects. Each user account may be associated with a user identification (ID) value and stored in database 114. The user computing device 122b may comprise a desktop computer, laptop computer, tablet computer, smartphone, wearable device, or any other type of computing device that is capable of proper communication with the server 102 as well as adequate local data processing and storage. In some cases, a user computing device 122b may be a personal computer or workstation that hosts or executes a GRC client such as a browser and communicates via HTTP and HTML, over the network 126 with a server-side GRC application hosted or executed at the server 102. In other cases, a user computing device 122b may be a server-class computer and/or virtual computing instance that hosts or executes an instance of an GRC application that communicates programmatically via API calls, RPC or other programmatic messaging with the server 102.

In some embodiments, the server 102 broadly represents one or more computers, such as a server farm, a cloud computing platform, or a parallel computer, virtual computing instances, and/or instances of a server-based application.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 may include computer-executable instructions, including GRC data management instructions 104, mapping generating instructions 106, cache generating instructions 108, hierarchical data generating instructions 110 and access control instructions 112.

In some embodiments, the GRC data management instructions 104 enable creating, storing and accessing GRC data. GRC data generally includes object data (i.e. data objects such as issues that have been entered into, and are being maintained by, the GRC data management instructions). In this example GRC data is stored on and managed by a database 114, though it could be alternatively stored, for example on a local file system of the server 102.

Object data may comprise one or data objects that each represent a data structure with multiple data fields. The fields defined with respect to a data object will depend on the requirements of a given GRC implementation. An example data object is an issue. An issue type definition may define the following fields: key field storing a unique identifier for an issue; a description field storing a description of an issue and actions taken with respect to the user account; a status field indicating the stage an issue is currently at in its lifecycle; an assigned person field indicating who (if anyone) an issue has been assigned to; a severity field storing the severity of an issue (e.g. critical, major, minor, etc.); a priority field storing the priority of an issue at a general level (e.g. very high, high, medium, low, very low); and a rank field storing a rank value in respect of an issue (defining a rank order of the issue relative to other issues).

In order to create and progress data objects such as issues, user accounts associated with user computing devices 122*a-c* interact with appropriate user interfaces provided by a GRC client 124. For example, a user account may create a new issue and provide relevant information in respect of the issue. Once a data object such as an issue has been created, a user account can interact with it, for example by issuing requests to the server modify the issue, read the issue, or delete the issue.

While creating a data object such as an issue, a user account may assign roles and privileges to the data object using tuples. The user account may map or assign roles and privileges to a tuple comprising one or more dimension values of a multidimensional organizational structure. Tuples can then be mapped to data objects and used to control authorization and access of data objects existing in the GRC system 100, as discussed herein.

A multidimensional organizational structure represents a structure of an organization. A multidimensional organizational structure includes one or more dimensions. Each dimension represents a different aspect of the organization and may include one or more dimension values, each of which may be included in a hierarchy of dimension values. For example, a multidimensional organizational structure may include dimensions such as 'Business Unit', 'Location', and 'Legal Entity' to represent a bank holding company. The 'Business Unit' dimension may include dimension values: 'Banking', 'Asset Management', 'Wealth Management', and 'Corporate Center'. The 'Location' dimension may include dimension values: 'Global', 'Europe', 'Germany', 'Portugal', 'Asia', 'India', and 'Sri Lanka'. The 'Legal Entity' dimension may include dimension values: 'Umbrella Corporation' and 'Umbrella Limited'. As part of the 'Location' dimension, dimension values 'Europe', 'Germany', 'Portugal', 'Asia', 'India', and 'Sri Lanka' may be included as part of the 'Global' dimension value hierarchy as child dimension values of the 'Global' dimension value. Additionally, the 'Germany' and 'Portugal' dimension values may be included as part of the 'Europe' dimension value hierarchy as child dimension values of the 'Europe' dimension value.

A tuple comprises one or more dimension values. Each dimension value corresponds to a different dimension of a multidimensional organizational structure. For example, the tuple 'Umbrella Corporation.Banking.Europe' is a represented by three different dimensions. The dimension value 'Umbrella Corporation' corresponds to the 'Legal Entity' dimension, the dimension value 'Banking' corresponds to the 'Business Unit' dimension, and the dimension value 'Europe' corresponds to the 'Location' dimension. As discussed above, each dimension value of a tuple may be included in a hierarchy of dimension values from the multidimensional organizational structure. For example, the dimension value 'Europe' may include child dimension values 'Germany' and 'Portugal' as part of the hierarchy for the 'Europe' dimension value.

Child dimension values inherit all roles and privileges assigned to their respective parent dimension values. For example, all roles and privileges assigned to the tuple 'Umbrella Corporation.Banking.Europe', are also assigned to 'Umbrella Corporation.Banking.Germany' and 'Umbrella Corporation.Banking.Portugal' because the dimension values 'Germany' and 'Portugal' are child dimension values as part of the hierarchy for the 'Europe' dimension value.

A user account, such as a privileged user account, of the GRC system 100 may define or create a multidimensional organizational structure specific to the user account's organization. This may be performed by a user computing device 122*a* on initialization or setup of the GRC system 100. A user account may also update an existing a multidimensional organizational structure. A user account can add or delete dimensions, add or delete dimension values, and modify hierarchies between dimension values. This is accomplished by a user computing device 112*a-c* issuing requests through the server 102 to update an existing multidimensional organizational structure, which may be stored in database 114.

In some embodiments, the mapping generating instructions 106 enable creating and storing mapping data 118 that comprises object mappings and entitlement mappings. Specifically, when a data object such as an issue is created by a user account, the data object may be associated with roles and privileges by a user account. The mapping generating instructions 106 communicate with the GRC data management instructions 104 to create and store an object mapping that maps the data object to a tuple. Additionally, when a user account is created in the system, a privileged user account such as an administrator may assign roles and privileges to the user account with respect to operations that the user account is entitled to execute on one or more data objects. The mapping generating instructions 106 create and store an entitlement mapping for each user account that maps operations to tuples. Each operation of the entitlement mapping is an operation that a user account is entitled to perform on data objects in different parts of the multidimensional organization structure represented by the tuple. Each of these mapping may comprise a table stored in database 114.

In some embodiments, the hierarchical data generating instructions 110 enable creating and storing hierarchical data 120. Specifically, when the GRC system 100 is initialized or setup, a privileged user account such as an administrator using a computing device 122*a-c* may create and configure hierarchical data by specifying different dimensions and associating each dimension with dimension values. Each dimension value may be part of a hierarchical set of dimension values for the associated dimension as indicated by the hierarchical data. The hierarchical data generating instructions 110 also enable updating the hierarchical data 120, such as when an administrator account creates a new dimension with new dimension values or creates new dimension values in an existing dimension. Hierarchical data 120 may comprise a table stored in database.

In some embodiments, cache generating instructions 108 enable generating cache data 116 that comprises entitlement caches and object mapping caches. Specifically, the cache generating instructions 108 can generate an entitlement cache based on hierarchical data 120 and mapping data 118. An entitlement cache may be generated for each user account that is registered in the GRC system 100. In general, an entitlement cache for a user account associates each operation that the user account is entitled to perform with an encoding of a tuple. Details on the encoding are further discussed herein. Additionally, the cache generating instructions 108 can generate an object mapping cache based on stored tuples and hierarchical data 120. In general, an object mapping cache associates each valid tuple stored in database 114 with an encoding of a tuple. Details on the encoding are further discussed herein. An entitlement cache and object mapping cache may each comprise a table stored in database 114.

In some embodiments, the access control instructions 112 enable receiving requests for access to data objects, receiving requests to manipulate data objects, receiving requests to delete data objects, and responding to such requests by determining what actions are allowed and restricted. The access control instructions 112 use the hierarchical data 120, mapping data 118, and cache data 116 to determine whether grant or deny access to different data objects in the GRC system 100. Details regarding the procedure used to grant or deny access to different data objects in the GRC system 100 are further discussed herein.

In some embodiments, the database is programmed or configured to manage relevant data structures and store relevant data for functions performed by the server 102. The data may include GRC data, hierarchical data 120, cache data 116, and mapping data 118.

In some embodiments, the network 126 may be implemented by any medium or mechanism that provides for the exchange of data between the various elements of FIG. 1. Examples of the network 126 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

3.0 EXAMPLE TRAVERSAL OF HIERARCHICAL DATA

Figure 2A:
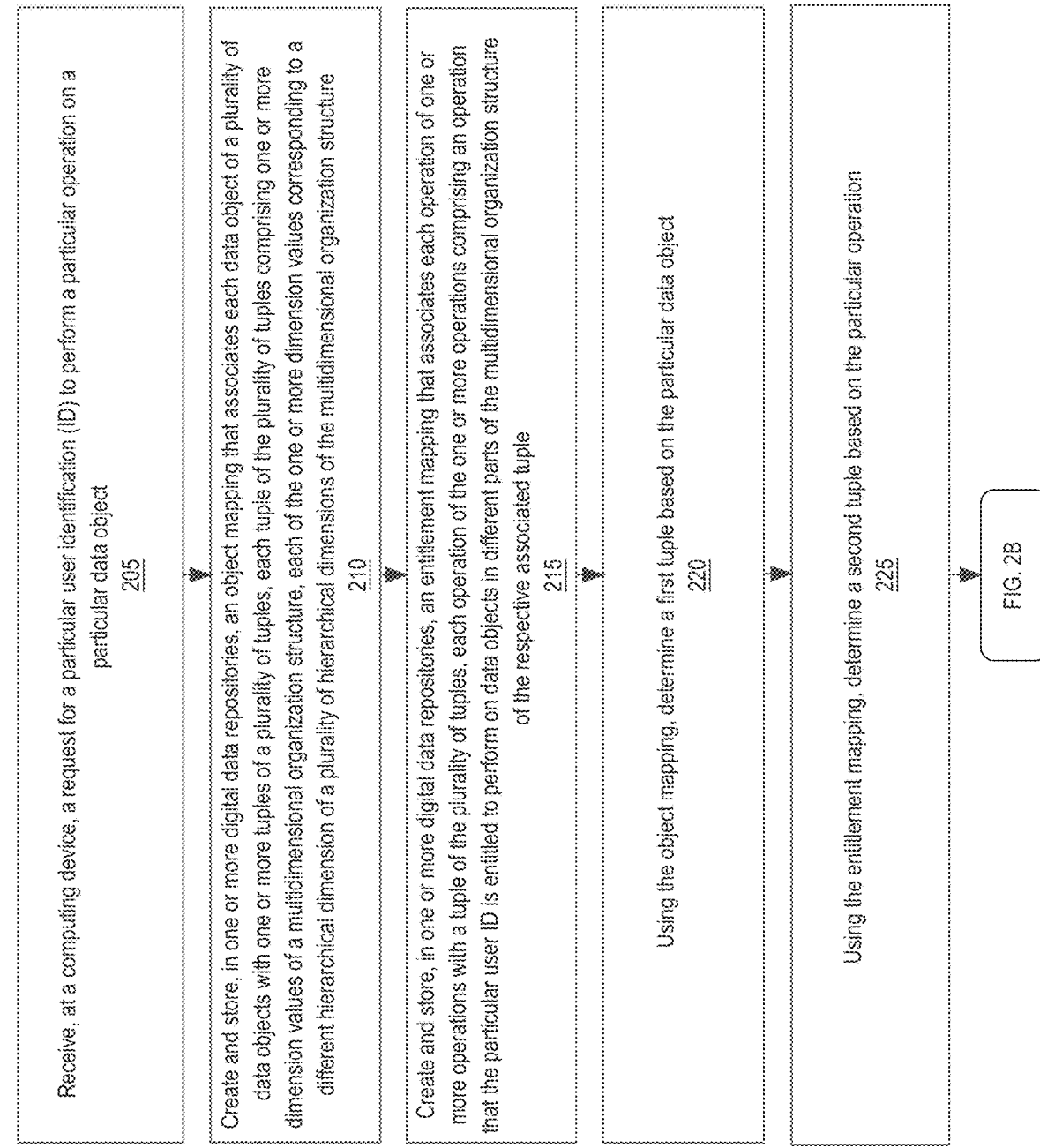
FIG. 2A illustrates an example programmable algorithm or method for traversing hierarchical data using a flow down query, according to an embodiment.

FIGS. 2A-2B illustrate an example programmable algorithm or method for traversing hierarchical data using a flow down query. Although the steps in FIGS. 2A-2B are shown in an order, the steps of FIGS. 2A-2B may be performed in any order and are not limited to the order shown in FIGS. 2A-2B. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 205, a request is received at a computing device for a particular user identification (ID) to perform a particular operation on a particular data object. For example, server 102 may receive a request to perform a particular operation on a particular data object stored in database 114 from a user account via GRC client 124 executing on a user computing device 122*b*. An example request may comprise a request for a user account to view or edit an issue type data object.

In step 210, an object mapping is created and stored in one or more digital data repositories. The object mapping associates each data object of a plurality of data objects with one or more tuples of a plurality of tuples. Each tuple of the plurality of tuples comprises one or more dimension values of a multidimensional organization structure, each of the one or more dimension values corresponding to a different hierarchical dimension of a plurality of hierarchical dimensions of the multidimensional organization structure. For example, the server 102 via mapping generating instructions 106 may create and store an object mapping in database 114 as mapping data 118.

Figure 4:
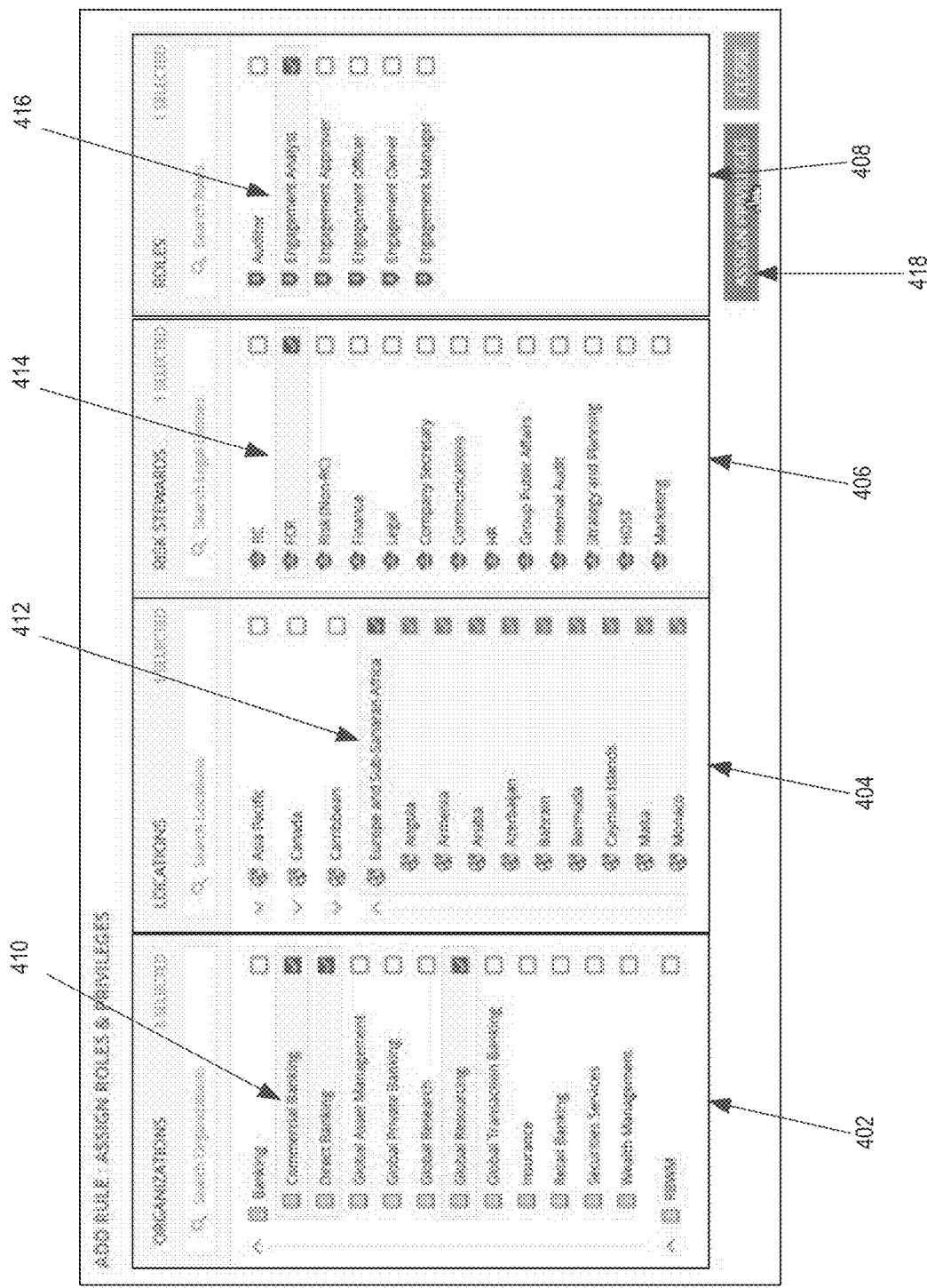
FIG. 4 depicts a screenshot of a graphical user interface (GUI) used to assign roles and privileges to data objects, according to an embodiment.

During the creation of a data object such as an issue or audit, a tuple may be associated with or assigned to the data object to create an object mapping. FIG. 4 is an example graphical user interface (GUI) used to assign roles and privileges to data objects. During the creation of a data object, a user account is presented with a GUI as shown in FIG. 4 to facilitate the creation and association of tuples with data objects. A user account can select dimension values from different hierarchical dimensions 402, 404, 406, 408 to create tuples to associate with data objects. For example, by selecting the 'Commerical Banking' dimension value 410 from the 'Organizations' hierarchical dimension 402, the 'Europe and Sub-Saharan Africa' dimension value 412 from the 'Locations' hierarchical dimension 404, the 'FCR' dimension value 414 from the 'Risk Stewards' hierarchical dimension 406, and the 'Engagement Analyst' dimension value 416 from the 'Roles' hierarchical dimension 408, the tuple 'Commerical Banking.Europe and Sub-Saharan Africa.FCR.Engagement Analyst' tuple is created. When the 'Assign Privileges' button 418 is activated by a user account, the object mapping is created and stored by associating the created tuple with a data object.

In step 215, an entitlement mapping is created and stored in one or more digital data repositories. The entitlement mapping associates each operation of one or more operations with a tuple of the plurality of tuples. Each operation of the one or more operations comprises an operation that the particular user ID is entitled to perform on data objects in different parts of the multidimensional organization structure of the respective associated tuple.

During the creation of a user account or after the creation of the user account in the GRC system 100, a privileged user account using a computing device 122*a-c* may assign privileges to the created user account to create an entitlement mapping. An entitlement mapping stores a mapping of the operations that a user account is entitled to perform on data objects in different parts of the multidimensional organization structure, which are represented by tuples.

As an example, a GUI similar to the GUI as shown in FIG. 4 may be used to create tuples to associate with different operations that a user account is entitled to perform in the GRC system. Such associations are stored in an entitlement mapping as shown in TABLE 1A below.

TABLE 1A

Entitlement Mapping

| Role | Activity | Organization | Comments |
|---|---|---|---|
| Issue owner | View Issue | Umbrella Corporation.Banking.Global | Permissions to view all the issues created in all the Organizations under Umbrella Corporation.Banking.Global |
| — | Edit Issue | Wolfram and Hart.Retail Branch Operations.Asia | Permissions to edit an issue under Wolfram and Hart.Retail Branch Operations.Asia |
| — | Edit Issue | SPECTRE.Consumer Lending.China | Permissions to edit an issue under SPECTRE.Consumer Lending.China |
| Audit Owner | View Audit | SPECTRE.Retail Banking.China | Permissions to View an Audit under SPECTRE.Retail Banking.China |
| — | Cancel Audit | SPECTRE.Retail Banking.Asia | Permissions to Cancel an Audit under SPECTRE.Retail Banking.Asia |

TABLE 1A depicts an entitlement mapping for a user account. Each row represents a different entitlement. For example, the first row indicates that the user account is entitled to permissions to view all the issues created in all the organizations related to the tuple 'Umbrella Corporation.Banking.Global'. The second row indicates that the user account is entitled to permissions to edit an issue in all the organizations related to the tuple: 'Wolfram and Hart.Retail Branch Operations.Asia'.

In step 220, using the object mapping, a first tuple is determined based on the particular data object. For example, the server 102 via the access control generating instructions 112 may query database 114 to retrieve the first tuple mapped to the particular data object from the object mapping stored as mapping data 118 in database 114.

In step 225, using the entitlement mapping, a second tuple is determined based on the particular operation. For example, the server 102 via the access control generating instructions 112 may query database 114 to retrieve the second tuple mapped to the particular operation from the entitlement mapping stored as mapping data 118 in database 114.

Steps 230-240 are repeated for each hierarchical dimension of the plurality of hierarchical dimensions of the multidimensional organization structure.

In step 230, a first hierarchical set of one or more dimension values is generated based on the dimension value of the first tuple that corresponds to the respective hierarchical dimension. For example, the server 102 via the access control generating instructions 112 performs a flow down query on the dimension value of the first tuple that corresponds to the respective hierarchical dimension to generate the one or more dimension values of the first hierarchical set. A flow down query comprises a query that traverses a hierarchical data structure, such as a dimension value of a tuple, to determine one or more dimension values that are included in a hierarchy of dimension values with the dimension value of the first tuple as the root dimension value. Thus, any child dimension values stemming from the dimension value of the first tuple are included in the generated first hierarchical set. A flow down query may be performed using a SQL CONNECT BY operator.

In one embodiment, hierarchical data 120 is created and stored in database 114 to facilitate the generation of hierarchical sets of dimension values. A privileged user account may create and configure hierarchical data by linking together dimension values that exist in the same dimension to create a hierarchical ordering of dimension values. Such links are stored in hierarchical data as shown in TABLE 1B below.

TABLE 1B

Hierarchical Data

| Location ID | Location | Parent Location ID |
|---|---|---|
| 1000 | Global | NULL |
| 2000 | ---Europe | 1000 |
| 3000 | ---Germany | 2000 |
| 4000 | ---Asia | 1000 |
| 5000 | ----China | 4000 |

TABLE 1B depicts hierarchical data for a dimension. Specifically, TABLE 1B depicts hierarchical data for a 'Locations' dimension of a multidimensional organization structure. As shown in TABLE 1B, each row or node includes a Location ID that identifies the location, a dimension value that indicates a location, and a Parent Location ID that indicates a parent dimension value ID. In the example of TABLE 1B, the node with dimension value 'Global' is a root node because all other nodes specified in the table directly or indirectly specify the 'Global' node as parent location ID. Thus, nodes with Location IDs 2000-5000 are all children ('child nodes') of the node corresponding to the 'Global' dimension value.

A flow down query may traverse hierarchical data to generate a first hierarchical set of one or more dimension values. A flow down query may return a set of dimension values from nodes of the hierarchical data that are child nodes of a dimension value specified in the flow down query. For example, a flow down query performed on the dimension value 'Global' from TABLE 1B will return a hierarchical set of the dimension values: 'Europe', 'Germany', 'Asia', 'China'. In another example, a flow down query performed on the dimension value 'Europe' from TABLE1B will return a hierarchical set of the dimension value: 'Germany'.

In step 235, a second hierarchical set of one or more dimension values is generated based on the dimension value of the second tuple that corresponds to the respective hierarchical dimension. Step 235 may be performed using the same techniques discussed with respect to step 230.

In step 240, a match is identified between the one or more dimension values of the first hierarchical set and the one or more dimension values of the second hierarchical set. For example, the server 102 via the access control generating instructions 112 may compare dimension values of the first hierarchical set and second hierarchical set to identify a match between the one or more dimension values of the first hierarchical set and the one or more dimension values of the second hierarchical set.

A match indicates that the particular user ID satisfies criteria for performing the particular operation on the particular data object in the respective dimension. For example, if the first hierarchical set includes dimension values: 'Asia', 'China', 'Taiwan' and the second hierarchical set includes dimension values: 'Global', 'Europe', 'Portugal', 'Spain', 'Asia', 'China', 'Taiwan', because the second hierarchical set, which is associated with user account privileges, includes all the dimension values of the first hierarchical set, which is associated with data object privileges, a match is identified. Thus, when it is determined that the particular user ID is associated with the requisite privileges to perform the particular operation on the particular data object in the respective dimension, a match is identified. In other embodiments, different criteria or rules may be specified to determine or identify a match.

In an embodiment, an exception check is performed. Exceptions may be represented by tuples referred to as 'exception tuples' and created by a privileged user account similar to how tuples are configured and created by a user account via GUI. Exception tuples may be stored in database 114 in association with entitlement mappings for a user account. Exception tuples are defined by one or more dimension values that a user ID is not privileged to access. As an example, an entry from an entitlement mapping may specify that a user account has permissions to view all the issues created in all the organizations under the tuple 'Umbrella Corporation.Banking.Global' except under the exception tuple 'Umbrella Corporation.Banking.Europe'.

In step 245, an exception check may be performed. The exception check may be performed by the access control generating instructions 112 and may include the steps of: generating a third hierarchical set of one or more dimension values based on the dimension value of the exception tuple that corresponds to the respective hierarchical dimension, removing the one or more dimension values of the third hierarchical set from the one or more dimension values of second hierarchical set to create an exception hierarchical set of one or more dimension values. The exception hierarchical set can be used similarly to the second hierarchical set in step 240 to identify a match for each hierarchical dimension. The steps of an exception check are repeated for each hierarchical dimension of the plurality of hierarchical dimensions of the multidimensional organization structure. In response to identifying a match for each hierarchical dimension of the plurality of hierarchical dimensions, the computing device grants the particular user ID access to the particular data object. If a match is not identified for each hierarchical dimension of the plurality of hierarchical dimensions, the computing device restricts the particular user ID from accessing the particular data object.

Steps 230-245 may be performed by specifying and performing a query. An example query is shown below in TABLE 1C.

TABLE 1C

Sample Query

SELECT iss.issue_id, 'Accessible'
FROM MS_ISSUES iss
WHERE iss.approver_org IN (
　SELECT org_id
　FROM si_orgs org
　START WITH org_id = :users_org_id
　CONNECT BY PRIOR org_id = parent_org_id)

TABLE 1C depicts a sample query for determining if a user account is allowed to access an issue data object in a single dimension. TABLE 1C provides an example of using the 'CONNECT BY' clause with hierarchical data (i.e. 'org_id', 'parent_org_id', 'user_org_id') to generate hierarchical sets of dimension values and identify matches between dimension values of hierarchal sets.

In step 250, in response to identifying a match for each hierarchical dimension of the plurality of hierarchical dimensions, the computing device grants the particular user ID access to the particular data object. Thus, access is granted for the particular user ID to perform the particular operation on the particular data object. Following the grant of access, the particular user ID may perform the particular operation on the particular data object via the server 102.

In an embodiment, if a match is not identified for each hierarchical dimension of the plurality of hierarchical dimensions, that is, if a match is not identified in at least one hierarchical dimension of the plurality of hierarchical dimensions, the computing device restricts the particular user ID access to the particular data object. Restricting access may include the server not allowing the particular user ID to perform the particular operation on the particular data object and/or transmitting a message to the particular user ID that indicates that the particular user ID does not have the required permissions to perform the particular operation on the particular data object.

Techniques described herein provide flexibility for organizations to define their own organization structure in context of dimensions and dimension values. Once an organization's structure is defined, techniques herein provide enhanced and efficient data security for information sharing across an organization. Specifically, the above discussed techniques provide an efficient system and algorithms for traversing hierarchical data to control access to data objects. These techniques offer, in addition to the improvements discussed above, reduced usage of network bandwidth, CPU cycles, storage, and/or memory because of the efficiency and efficacy of the algorithms that are disclosed.

4.0 EXAMPLE NESTED SET TRAVERSAL OF HIERARCHICAL DATA

Figure 3B:
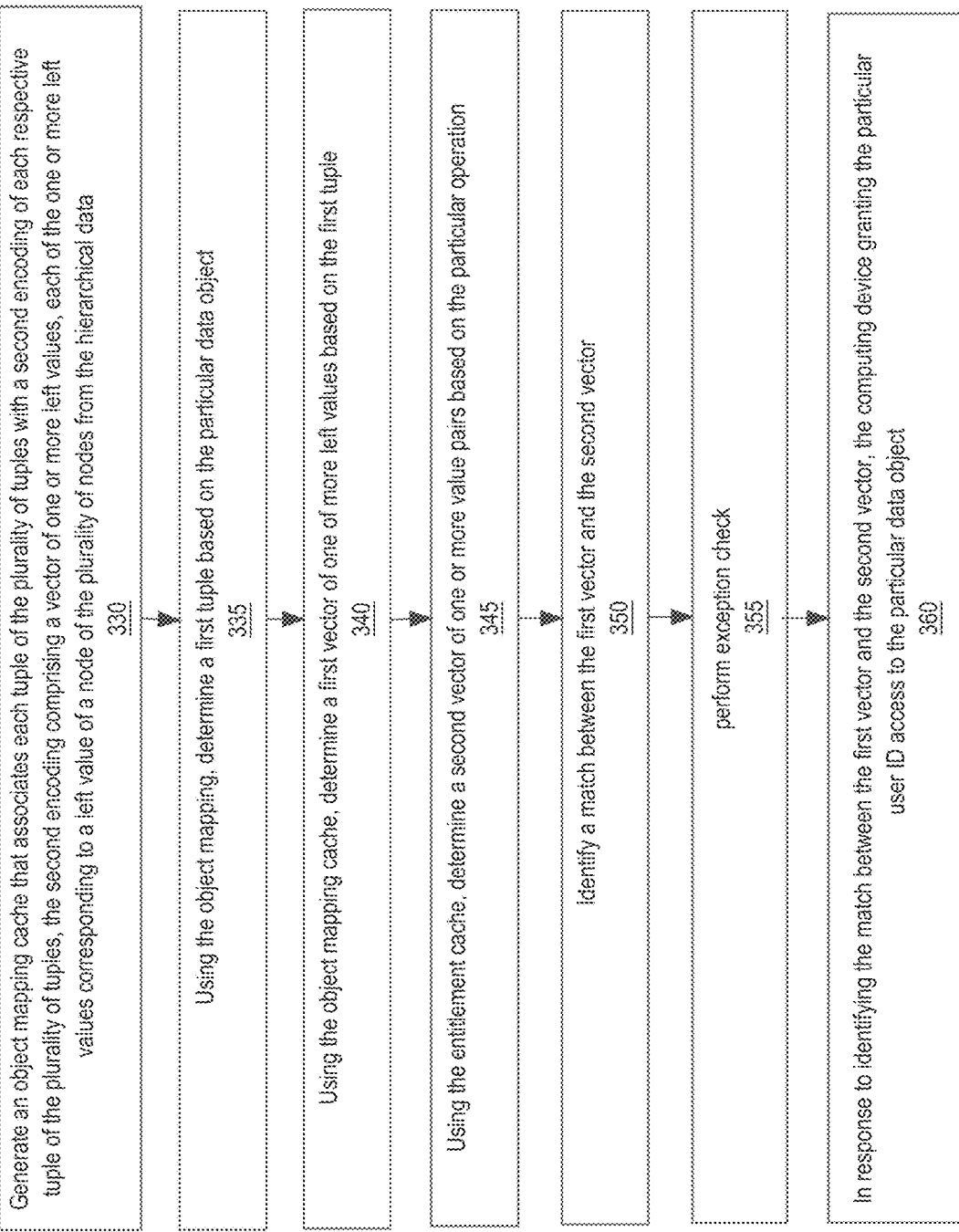
FIG. 3B illustrates an example programmable algorithm or method traversing hierarchical data using a nested set, according to an embodiment.

FIGS. 3A-3B illustrate an example programmable algorithm or method traversing hierarchical data using a nested set. Although the steps in FIGS. 3A-3B are shown in an order, the steps of FIGS. 3A-3B may be performed in any order and are not limited to the order shown in FIGS. 3A-3B. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 305, a request is received at a computing device for a particular user identification (ID) to perform a particular operation on a particular data object. For example, server 102 may receive a request to perform a particular operation on a particular data object stored in database 114 from a user account via GRC client 124 executing on a user computing device 122b. An example request may comprise a request for a user account to view or edit an issue type data object.

In step 310, an object mapping is created and stored in one or more digital data repositories. The object mapping associates each data object of a plurality of data objects with one or more tuples of a plurality of tuples. Each tuple of the plurality of tuples comprises one or more dimension values of a multidimensional organization structure, each of the one or more dimension values corresponding to a different hierarchical dimension of a plurality of hierarchical dimensions of the multidimensional organization structure. For example, the server 102 via mapping generating instructions 106 may create and store an object mapping in database 114 as mapping data 118.

During the creation of a data object such as an issue or audit, a tuple may be associated with or assigned to the data object to create an object mapping. FIG. 4 is an example graphical user interface (GUI) used to assign roles and privileges to data objects. During the creation of a data object, a user account is presented with a GUI as shown in FIG. 4 to facilitate the creation and association of tuples with data objects. A user account can select dimension values from different hierarchical dimensions 402, 404, 406, 408 to create tuples to associate with data objects. For example, by selecting the 'Commerical Banking' dimension value 410 from the 'Organizations' hierarchical dimension 402, the 'Europe and Sub-Saharan Africa' dimension value 412 from the 'Locations' hierarchical dimension 404, the 'FCR' dimension value 414 from the 'Risk Stewards' hierarchical dimension 406, and the 'Engagement Analyst' dimension value 416 from the 'Roles' hierarchical dimension 408, the tuple 'Commerical Banking.Europe and Sub-Saharan Africa.FCR.Engagement Analyst' tuple is created. When the 'Assign Privileges' button 418 is activated by a user account, the object mapping is created and stored by associating the created tuple with a data object.

In step 315, an entitlement mapping is created and stored in one or more digital data repositories. The entitlement mapping associates each operation of one or more operations with a tuple of the plurality of tuples. Each operation of the one or more operations comprises an operation that the particular user ID is entitled to perform on data objects in different parts of the multidimensional organization structure of the respective associated tuple.

During the creation of a user account or after the creation of the user account in the GRC system 100, a privileged user account using a computing device 122a-c may assign privileges to the created user account to create an entitlement mapping. An entitlement mapping stores a mapping of the operations that a user account is entitled to perform on data objects in different parts of the multidimensional organization structure, which are represented by tuples.

As an example, a GUI similar to the GUI as shown in FIG. 4 may be used to create tuples to associate with different operations that a user account is entitled to perform in the GRC system. Such associations are stored in an entitlement mapping as shown in TABLE 2A below.

TABLE 2A

Entitlement Mapping

| Role | Activity | Organization | Comments |
|---|---|---|---|
| Issue owner | View Issue | Umbrella Corporation.Banking.Global | Permissions to view all the issues created in all the Organizations under Umbrella Corporation.Banking.Global |
| — | Edit Issue | Wolfram and Hart.Retail Branch Operations.Asia | Permissions to edit an issue under Wolfram and Hart.Retail Branch Operations.Asia |
| — | Edit Issue | SPECTRE.Consumer Lending.China | Permissions to edit an issue under SPECTRE.Consumer Lending.China |
| Audit Owner | View Audit | SPECTRE.Retail Banking.China | Permissions to View an Audit under SPECTRE.Retail Banking.China |
| — | Cancel Audit | SPECTRE.Retail Banking.Asia | Permissions to Cancel an Audit under SPECTRE.Retail Banking.Asia |

TABLE 2A depicts an entitlement mapping for a user account. Each row represents a different entitlement. For example, the first row indicates that the user account is entitled to permissions to view all the issues created in all the organizations related to the tuple 'Umbrella Corporation.Banking.Global'. The second row indicates that the user account is entitled to permissions to edit an issue in all the organizations related to the tuple: 'Wolfram and Hart.Retail Branch Operations.Asia'.

In step 320, hierarchical data is created and stored in one or more digital data repositories. The hierarchical data comprises a plurality of nodes, each node of the plurality of nodes comprises a dimension value, a left value, and a right value. For example, hierarchical data 120 is created and stored in database 114. A privileged user account using a computing device 122a-c may create and configure hierarchical data by assigning a dimension value, left value, and a right value to each node of a plurality of nodes. Example hierarchical data comprising a plurality of nodes is shown in TABLE 1B below.

TABLE 2B

Hierarchical Data

| Location | Left | Right |
|---|---|---|
| Global | 1 | 5 |
| Europe | 2 | 3 |
| Germany | 3 | 3 |
| Asia | 4 | 5 |
| China | 5 | 5 |

TABLE 2B depicts hierarchical data comprising a plurality of nodes for a dimension. Specifically, TABLE 2B depicts hierarchical data for a 'Locations' dimension of a multidimensional organization structure. As shown in TABLE 2B, each row or node includes a Location that identifies the location, a left value represented by an integer value, and a right value represented by an integer value. A first node is an ancestor of a second node when the left value of the first node is less than or equal to the left value of the second node and the left value of the second node is less than or equal to the right value of the first node. For example, the node with location 'Europe' is an ancestor of the node with location 'Germany' because the left value of the 'Europe' node '2' is less than or equal to the left value of the 'Germany' node '3' and the left value of the 'Germany node '3' is less than or equal to the right value of the 'Europe' node '3'. As another example, the node with location 'Germany' is not an ancestor of the node with location 'Asia' because the left value of the 'Asia' node '4' is not less than or equal to the right value of the 'Germany' node '3'. Thus, by comparing left and right integer values of each node, a hierarchy between nodes can efficiently be determined.

The left and right values of each node are determined and assigned using a nested set technique. An example nested set technique may comprise traversing the hierarchy of "Location" nodes of the "Locations" dimension. The traversal visits each node twice, assigning numbers in the order of visiting, and at both visits. The first number becomes the left value and the second number becomes the right value. Nested set techniques are explained in an article available online at the article titled "Nested Set Model" of the Wikipedia service.

In step 325, an entitlement cache is generated that associates each operation that the particular user ID is entitled to perform with a first encoding of a tuple of the plurality of tuples. The first encoding comprising a vector of one or more value pairs, each value pair of the one or more value pairs including a left value and right value, each of the one or more value pairs corresponding to the left value and the right value of a node of the plurality of nodes from the hierarchical data. For example, the server 102 generates an entitlement cache using cache generating instructions 108. The server 102 may generate the entitlement cache as a combination of data from the hierarchical data created in step 320 and the entitlement mapping created in step 215. The entitlement cache may be stored as cache data 116 in database 114 or stored in memory associated with server 102 for efficient access by server 102. An example an entitlement cache is shown in TABLE 2C below:

TABLE 2C

Entitlement Cache

| Activity | Organization | Encoded Entitlement Organization |
|---|---|---|
| View Issue | Umbrella Corporation.Banking.Global | 1-5 \| 1-5 \| 1-5 |
| Edit Issue | Wolfram and Hart.Retail Branch Operations.Asia | 4-4 \| 4-4 \| 4-5 |
| Edit Issue | SPECTRE.Consumer Lending.China | 5-5 \| 5-5 \| 5-5 |
| View Audit | SPECTRE.Retail Banking.China | 5-5 \| 3-5 \| 5-5 |
| Cancel Audit | SPECTRE.Retail Banking. Asia | 5-5 \| 3-5 \| 4-5 |

TABLE 2C depicts an entitlement cache that associates each operation that the particular user ID is entitled to perform with a first encoding of a tuple of the plurality of tuples. As discussed above, the first encoding comprises a vector of one or more value pairs, each value pair of the one or more value pairs including a left value and right value, each of the one or more value pairs corresponding to the left value and the right value of a node of the plurality of nodes from the hierarchical data. For example, as shown in TABLE 2C, the tuple 'Umbrella Corporation.Banking.Global' is associated with the first encoding '1-5|1-5|1-5'. Each value pair of the first encoding '1-5|1-5|1-5' corresponds to the left and right values of a node from the hierarchical data that corresponds to a different dimension value from the tuple 'Umbrella Corporation.Banking.Global'. The first value pair '1-5' corresponds to the left and right values of a node associated with the 'Umbrella Corporation' dimension value from the hierarchical data. The second value pair '1-5' corresponds to the left and right values of a node associated with the 'Banking' dimension value from the hierarchical data. The third value pair '1-5' corresponds to the left and right values of a node associated with the 'Global' dimension value from the hierarchical data.

In step 330, an object mapping cache is generated that associates each tuple of the plurality of tuples with a second encoding of each respective tuple of the plurality of tuples. The second encoding comprises a vector of one or more left values, each of the one or more left values corresponding to a left value of a node of the plurality of nodes from the hierarchical data. For example, the server 102 generates an object mapping cache using cache generating instructions 108. The server 102 may generate the object mapping cache based on data from the hierarchical data created in step 320. The object mapping cache may be stored as cache data 116 in database 114 or stored in memory associated with server 102 for efficient access by server 102. An example an object mapping cache is shown in TABLE 2C below:

TABLE 2D

Object Mapping Cache

| Organization | Encoded Object Mapping |
|---|---|
| Umbrella Corporation.Banking.Global | 1 \| 1 \| 1 |
| Advanced Idea Mechanics.Wealth Management.Europe | 2 \| 2 \| 2 |
| Advanced Idea Mechanics.Retail Banking.Europe | 2 \| 3 \| 2 |
| SPECTRE.Consumer Lending.China | 5 \| 5 \| 5 |

TABLE 2D depicts an object mapping cache that associates each tuple of the plurality of tuples with a second encoding of each respective tuple of the plurality of tuples. The second encoding comprises a vector of one or more left values, each of the one or more left values corresponding to a left value of a node of the plurality of nodes from the hierarchical data. For example, as shown in TABLE 2D, the tuple 'Umbrella Corporation.Banking.Global' is associated with the second encoding '1|1|1'. Each left value of the second encoding '1|1|1' corresponds to the left value of a node from the hierarchical data that corresponds to a different dimension value from the tuple 'Umbrella Corporation.Banking.Global'. The left value '1' corresponds to the left value of a node associated with the 'Umbrella Corporation' dimension value from the hierarchical data. The second left value '1' corresponds to the left value of a node associated with the 'Banking' dimension value from the hierarchical data. The third left value '1' corresponds to the left value of a node associated with the 'Global' dimension value from the hierarchical data.

In step 335, using the object mapping, a first tuple is determined based on the particular data object. For example, the server 102 via the access control generating instructions 112 may query database 114 to retrieve the first tuple mapped to the particular data object from the object mapping stored as mapping data 118 in database 114.

In step 340, using the object mapping cache, a first vector of one or more left values is determined based on the first tuple. For example, the server 102 via the access control generating instructions 112 may query database 114 to retrieve a first vector of one or more left values mapped to the first tuple from the object mapping cache stored as cache data 116 in database 114.

In step 345, using the entitlement cache, a second vector of one or more value pairs is determined based on the particular operation. For example, the server 102 via the access control generating instructions 112 may query database 114 to retrieve a second vector of one or more value pairs mapped to the particular operation from the entitlement cache stored as cache data 116 in database 114.

In step 350, a match is identified between the first vector and second vector. A match indicates that the particular user ID satisfies criteria for performing the particular operation on the particular data object in the respective dimension. Identifying a match comprises determining that each of the one or more left values of the first vector are between the corresponding left values and right values of the one or more value pairs of the second vector. For example, the server 102 via the access control generating instructions 112 may compare each left value of the first vector to the corresponding value pairs of the second vector to determine if each left value of the first vector is between the left and right values of the corresponding value pair of the second vector.

As a first example, if the first vector of left values is '2|3|2' and the second vector of the one or more value pairs is '1-5|1-6|1-4', the first left value '2' is between the left and right values of the corresponding value pair '1-5', the left value '3' is between the left and right values of the corresponding value pair '1-6', and the final left value '2' is between the left and right values of the corresponding value pair '1-4'. A match is identified because each of the one or more left values of the first vector are between the corresponding left values and right values of the one or more value pairs of the second vector.

As a second example, if the first vector of left values is '2|3|2' and the second vector of the one or more value pairs is '1-5|1-2|1-4', the first left value '2' is between the left and right values of the corresponding value pair '1-5', the left value '3' is not between the left and right values of the corresponding value pair '1-2', and the final left value '2' is between the left and right values of the corresponding value pair '1-4'. Because the '3' value of the first vector of left values is not between the corresponding value pair '1-2' from the second vector, a match is not identified.

In step 355, an exception check may be performed. Exceptions may be represented by an exception vector that represents an encoding of a tuple as value pairs of left and right values. Exception vectors may be created by a privileged user account similar to how tuples are configured and created by a user account via GUI. Exception vectors may be stored in database 114 in association with entitlement caches for a user account. Exception vectors are defined by one or more value pairs that a user ID is not privileged to access. As an example, an entry from an entitlement cache may specify that a user account has permissions to view all the issues created in all the organizations under the vector '1-5|1-5|1-5' that corresponds to the tuple 'Umbrella Corporation.Banking.Global' except under the exception vector '1-5, 1-5, 4-5' that corresponds to the tuple 'Umbrella Corporation.Banking.Asia'.

An exception check may be performed by the access control generating instructions 112 and may include the steps of: determining an exception vector of one or more value pairs that corresponds to the second vector of one or more value pairs. The exception vector can be used in place of the second vector such as in step 250 to identify a match between the first vector and the exception vector. In response to identifying a match between the first vector and the exception vector, the computing device restricts the particular user ID from accessing the particular data object. If a match is not identified between the first vector and the exception vector, the computing device grants the particular user ID access to the particular data object.

In step 360, in response to identifying the match between the first vector and the second vector, the computing device granting the particular user ID access to the particular data object. Thus, access is granted for the particular user ID to perform the particular operation on the particular data object. Following the grant of access, the particular user ID may perform the particular operation on the particular data object via the server 102.

In an embodiment, in response to determining that each of the one or more left values of the first vector are between the corresponding left values and right values of the one or more value pairs of the second vector such as in step 350, the particular user is granted access to the particular data object.

In an embodiment, if a match is not identified between the first vector and second vector, the computing device restricts the particular user ID access to the particular data object. Restricting access may include the server not allowing the particular user ID to perform the particular operation on the particular data object and/or the server transmitting a message to the particular user ID that indicates that the particular user ID does not have the required permissions to perform the particular operation on the particular data object.

By encoding hierarchical tuples into integer values using the techniques discussed herein, traversals and comparisons of hierarchical data can be executed using simple integer comparisons. Thus, these techniques conserve CPU cycles, storage, and memory because of because of the efficiency and efficacy of the above disclosed algorithms

5.0 IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
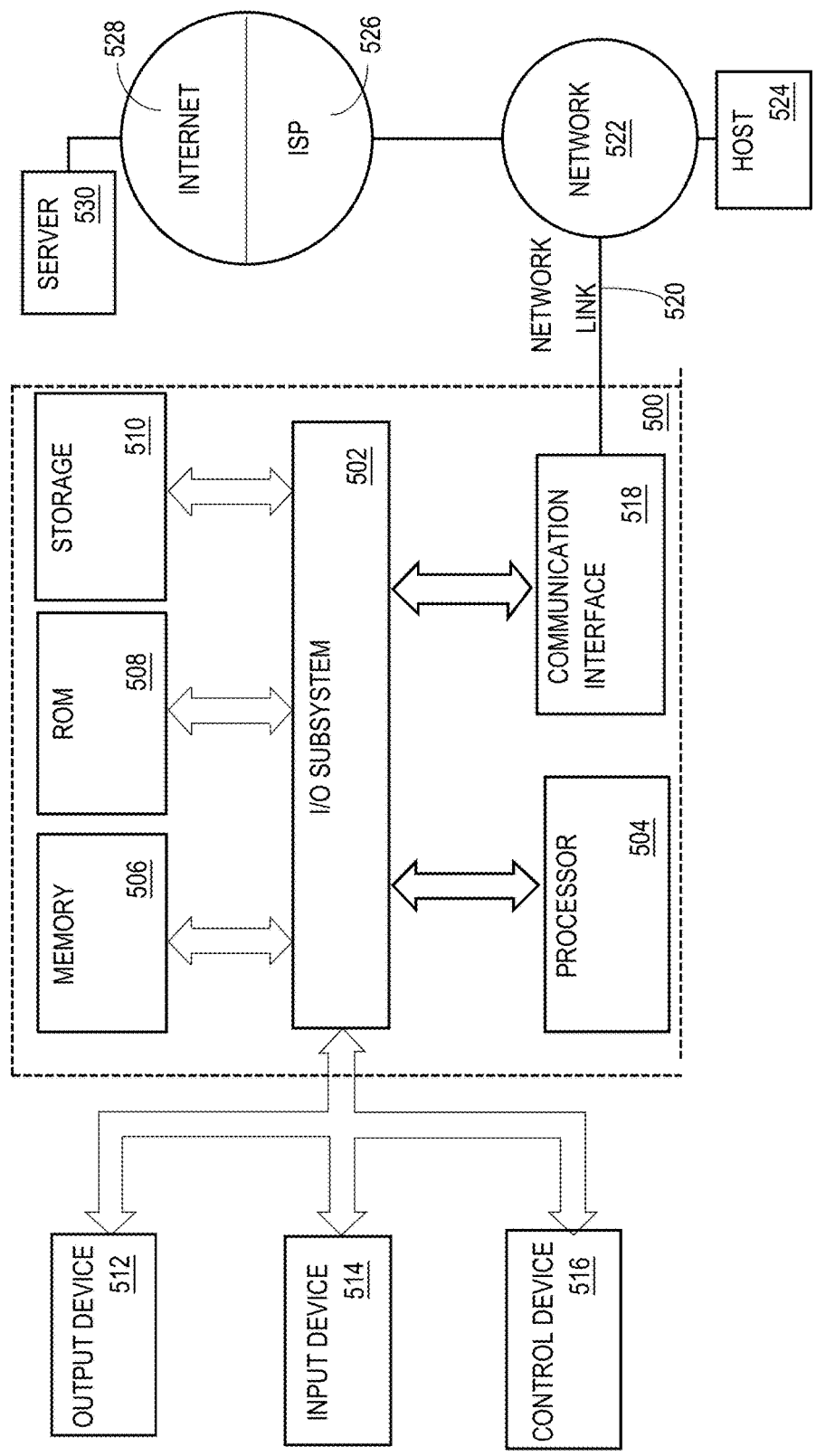
FIG. 5 is a block diagram that illustrates a computer system upon which an embodiment of the invention may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0 EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method comprising:

creating and storing, in one or more digital data repositories, hierarchical data comprising a plurality of nodes, each node of the plurality of nodes comprising a dimension value that is a component in a tuple, a left value, and a right value;

generating an entitlement cache that associates each operation of one or more operations with a first encoding of a tuple of a plurality of tuples, the first encoding of the tuple comprising a vector of one or more value pairs, each value pair of the one or more value pairs corresponding to a dimension of the tuple and including a left value and right value, each of the one or more value pairs corresponding to the left value and the right value of a node of the plurality of nodes from the hierarchical data;

generating an object mapping cache that associates each tuple of the plurality of tuples with a second encoding of each respective tuple of the plurality of tuples, the second encoding of each respective tuple comprising a vector of one or more left values, each of the one or more left values corresponding to a left value of a node of the plurality of nodes from the hierarchical data;

receiving, at a computing device, a request to perform a particular operation on a particular data object;

using the object mapping cache, determining a first vector of one of more left values based on the request;

using the entitlement cache, determining a second vector of one or more value pairs based on the request;

in response to identifying a match between the first vector and the second vector, the computing device granting access to the particular data object.

2. The method of claim 1, wherein a first node of the plurality of nodes is an ancestor of a second node of the plurality of nodes when the left value of the first node is less than or equal to the left value of the second node and the left value of the second node is less than or equal to the right value of the first node.

3. The method of claim 1, further comprising:

creating and storing, in one or more digital data repositories, an object mapping that associates each data object of a plurality of data objects with one or more tuples of the plurality of tuples, each tuple of the plurality of tuples comprising one or more dimension values and indicating a multidimensional organization structure, each of the one or more dimension values corresponding to a different hierarchical dimension of a plurality of hierarchical dimensions;

wherein the object mapping cache is generated based on the hierarchical data and the object mapping.

4. The method of claim 1, further comprising:

creating and storing, in one or more digital data repositories, an entitlement mapping that associates each operation of the one or more operations with a tuple of the plurality of tuples, each operation of the one or more operations comprising an operation that a particular user ID is entitled to perform on data objects in different parts of a multidimensional organization structure of the respective associated tuple.

5. The method of claim 4, wherein the entitlement cache is generated based on the hierarchical data and the entitlement mapping.

6. The method of claim 1, wherein identifying a match between the first vector and the second vector comprises:
determining that each of the one or more left values of the first vector are between the corresponding left values and right values of the one or more value pairs of the second vector.

7. The method of claim 1, further comprising:
in response to not identifying a match between the first vector and second vector, restricting access to the particular data object.

8. The method of claim 1, wherein the request is associated with a particular user ID and in response to identifying a match between the first vector and the second vector, granting the particular user ID access to the particular data object.

9. The method of claim 1, further comprising:
determining an exception vector of one or more value pairs that corresponds to the second vector of one or more value pairs;
identifying a match between the first vector and the exception vector;
in response to identifying a match between the first vector and the exception vector, restricting access to the particular data object.

10. The method of claim 9, further comprising:
in response to not identifying a match between the first vector and exception vector, granting access to the particular data object.

11. A computer system comprising:
one or more processors;
one or more memories storing instructions which, when executed by the one or more processors, cause the one or more processors to perform:
creating and storing, in one or more digital data repositories, hierarchical data comprising a plurality of nodes, each node of the plurality of nodes comprising a dimension value that is a component in a tuple, a left value, and a right value;
generating an entitlement cache that associates each operation of one or more operations with a first encoding of a tuple of a plurality of tuples, the first encoding of the tuple comprising a vector of one or more value pairs, each value pair of the one or more value pairs corresponding to a dimension of the tuple and including a left value and right value, each of the one or more value pairs corresponding to the left value and the right value of a node of the plurality of nodes from the hierarchical data;
generating an object mapping cache that associates each tuple of the plurality of tuples with a second encoding of each respective tuple of the plurality of tuples, the second encoding of each respective tuple comprising a vector of one or more left values, each of the one or more left values corresponding to a left value of a node of the plurality of nodes from the hierarchical data;
receiving, at a computing device, a request to perform a particular operation on a particular data object;
using the object mapping cache, determining a first vector of one of more left values based on the request;
using the entitlement cache, determining a second vector of one or more value pairs based on the request;
in response to identifying a match between the first vector and the second vector, the computing device granting access to the particular data object.

12. The computer system of claim 11, wherein a first node of the plurality of nodes is an ancestor of a second node of the plurality of nodes when the left value of the first node is less than or equal to the left value of the second node and the left value of the second node is less than or equal to the right value of the first node.

13. The computer system of claim 11, further comprising instructions which, when executed by the one or more processors, cause:
creating and storing, in one or more digital data repositories, an object mapping that associates each data object of a plurality of data objects with one or more tuples of the plurality of tuples, each tuple of the plurality of tuples comprising one or more dimension values and indicating a multidimensional organization structure, each of the one or more dimension values corresponding to a different hierarchical dimension of a plurality of hierarchical dimensions;
wherein the object mapping cache is generated based on the hierarchical data and the object mapping.

14. The computer system of claim 11, further comprising instructions which, when executed by the one or more processors, cause:
creating and storing, in one or more digital data repositories, an entitlement mapping that associates each operation of the one or more operations with a tuple of the plurality of tuples, each operation of the one or more operations comprising an operation that a particular user ID is entitled to perform on data objects in different parts of a multidimensional organization structure of the respective associated tuple.

15. The computer system of claim 14, wherein the entitlement cache is generated based on the hierarchical data and the entitlement mapping.

16. The computer system of claim 11, wherein identifying a match between the first vector and the second vector comprises:
determining that each of the one or more left values of the first vector are between the corresponding left values and right values of the one or more value pairs of the second vector.

17. The computer system of claim 11, further comprising instructions which, when executed by the one or more processors, cause:
in response to not identifying a match between the first vector and second vector, restricting access to the particular data object.

18. The computer system of claim 11, wherein the request is associated with a particular user ID and in response to identifying a match between the first vector and the second vector, granting the particular user ID access to the particular data object.

19. The computer system of claim 11, further comprising instructions which, when executed by the one or more processors, cause:
determining an exception vector of one or more value pairs that corresponds to the second vector of one or more value pairs;
identifying a match between the first vector and the exception vector;
in response to identifying a match between the first vector and the exception vector, restricting access to the particular data object.

20. The computer system of claim 19, further comprising instructions which, when executed by the one or more processors, cause:
in response to not identifying a match between the first vector and exception vector, granting access to the particular data object.

* * * * *